(12) United States Patent
Benamar et al.

(10) Patent No.: US 12,049,219 B2
(45) Date of Patent: Jul. 30, 2024

(54) METHOD FOR PREVENTING A COLLISION BETWEEN A MOTOR VEHICLE AND AN OBJECT, USING A LIGHT MODULE

(71) Applicant: VALEO VISION, Bobigny (FR)

(72) Inventors: Fatima Benamar, Bobigny (FR); Mickael Mimoun, Bobigny (FR); Rezak Mezari, Bobigny (FR)

(73) Assignee: Valeo Vision, Bobigny (FR)

( * ) Notice: Subject to any disclaimer, the term of this patent is extended or adjusted under 35 U.S.C. 154(b) by 283 days.

(21) Appl. No.: 17/618,833

(22) PCT Filed: Jun. 18, 2020

(86) PCT No.: PCT/EP2020/067052
§ 371 (c)(1),
(2) Date: Dec. 13, 2021

(87) PCT Pub. No.: WO2020/260144
PCT Pub. Date: Dec. 30, 2020

(65) Prior Publication Data
US 2022/0355816 A1    Nov. 10, 2022

(30) Foreign Application Priority Data
Jun. 25, 2019    (FR) ...................................... 1906870

(51) Int. Cl.
*B60Q 1/00*    (2006.01)
*B60Q 1/50*    (2006.01)
(Continued)

(52) U.S. Cl.
CPC ............. *B60W 30/09* (2013.01); *B60Q 1/525* (2013.01); *B60W 30/0956* (2013.01);
(Continued)

(58) Field of Classification Search
CPC .. B60W 30/09; B60W 30/0956; B60W 40/04; B60W 50/14; B60W 2050/146;
(Continued)

(56) References Cited

U.S. PATENT DOCUMENTS 7,893,819 B2    2/2011    Pfeiffer et al.
9,493,118 B1    11/2016    Aur et al.
(Continued)

FOREIGN PATENT DOCUMENTS

CN    107615352 A    1/2018
CN    109070794 A    12/2018
(Continued)

OTHER PUBLICATIONS

Chinese Patent Office, Office Action (with English cover letter) of corresponding Patent Application No. CN-202080045872.3, dated Feb. 18, 2023.
(Continued)

*Primary Examiner* — Toan N Pham
(74) *Attorney, Agent, or Firm* — Valeo Vision (57) ABSTRACT

A method for preventing a collision between a motor vehicle and at least one target object, the motor vehicle includes a detection system capable of detecting the target object and a warning system including at least one light module. The method includes detecting the target object and determining a position and a speed of the target object using the detection system. The method further includes estimating a critical trajectory likely to be followed by the target object in order to collide with the vehicle depending on the position and the speed of the target object, the critical trajectory being associated with a collision risk/collision time relationship. The method additional includes transmitting at least one light warning to the driver of the vehicle using the light module of the warning system.

15 Claims, 4 Drawing Sheets

(51) Int. Cl.
  *B60W 30/09* (2012.01)
  *B60W 30/095* (2012.01)
  *B60W 40/04* (2006.01)
  *B60W 50/14* (2020.01)

(52) U.S. Cl.
  CPC ............ *B60W 40/04* (2013.01); *B60W 50/14* (2013.01); *B60Q 2300/45* (2013.01); *B60Q 2400/50* (2013.01); *B60W 2050/146* (2013.01); *B60W 2554/4041* (2020.02); *B60W 2554/4045* (2020.02); *B60W 2554/4049* (2020.02); *B60W 2556/20* (2020.02)

(58) Field of Classification Search
  CPC . B60W 2554/4041; B60W 2554/4045; B60W 2554/4049; B60W 2556/20; B60W 30/0953; B60W 2050/143; B60Q 1/525; B60Q 2300/45; B60Q 2400/50; B60Q 3/80; B60Q 9/008; B60R 21/0134
  See application file for complete search history.

(56) References Cited

U.S. PATENT DOCUMENTS

| | | | |
|---|---|---|---|
| 9,583,003 B2 * | 2/2017 | Shimizu | ................ B60Q 1/525 |
| 9,987,979 B2 * | 6/2018 | Kawamata | ............. B60K 35/00 |
| 10,043,395 B2 * | 8/2018 | Morel | ..................... B60Q 1/26 |
| 10,672,273 B2 | 6/2020 | Minemura et al. | |
| 10,960,815 B2 | 3/2021 | Li et al. | |
| 2005/0131646 A1 | 6/2005 | Camus | |
| 2007/0080825 A1 | 4/2007 | Shiller | |
| 2011/0238309 A1 | 9/2011 | Tsunekawa | |
| 2012/0283895 A1 * | 11/2012 | Noda | ..................... G08G 1/166 701/1 |
| 2017/0255093 A1 * | 9/2017 | Fujita | ..................... G01S 13/931 |
| 2019/0337533 A1 | 11/2019 | Kume et al. | |

FOREIGN PATENT DOCUMENTS

| | | |
|---|---|---|
| FR | 2979311 A1 | 3/2013 |
| JP | 2006099715 A | 4/2006 |
| JP | 2006160116 A | 6/2006 |
| JP | 2010070047 A | 4/2010 |
| JP | 2018163482 A | 10/2018 |
| JP | 2018169771 A | 11/2018 |
| WO | 2006092431 A1 | 9/2006 |
| WO | 2010067397 A1 | 6/2010 |
| WO | 2018091563 A1 | 5/2018 |
| WO | 2018173455 A1 | 9/2018 |

OTHER PUBLICATIONS

European Patent Office, International Search Report (with English translation) and Written Opinion of corresponding application No. PCT/EP2020/067052, dated Jul. 9, 2020.

Japanese Patent Office, Search Report (with English translation) of corresponding Patent Application No. 2021-507649, dated Dec. 22, 2022.

Japanese Patent Office, Office Action (with English translation) of corresponding Patent Application No. 2021-507649, dated Jan. 24, 2023.

* cited by examiner

METHOD FOR PREVENTING A COLLISION BETWEEN A MOTOR VEHICLE AND AN OBJECT, USING A LIGHT MODULE

CROSS-REFERENCE TO RELATED APPLICATIONS

This is a 371 application (submitted under 35 U.S.C. § 371) of International Application No. PCT/EP2020/067052 (WO2020/260144) filed on Jun. 18, 2020, which claims priority date benefit to French Application No. 1906870 filed Jun. 25, 2019, the disclosures of which are incorporated herein by reference in their entirety.

TECHNICAL FIELD

The invention relates to the field of automotive lighting and/or signaling and the lighting of the interior of the passenger compartment of a motor vehicle. More specifically, the invention relates to a method for preventing a collision of a motor vehicle with an object which implements a light module of a motor vehicle.

BACKGROUND

Motor vehicles employ collision prevention systems. As is known, such a collision prevention system comprises a device for detecting one or more objects liable to collide with the vehicle, an alert system comprising a light module for alerting the driver so that they can adjust their trajectory and avoid the one or more objects. This system is further associated with an autonomous emergency braking (AEB) system capable of automatically triggering the braking of the vehicle if the driver does not react or if the risk is imminent.

SUMMARY

However, the alert systems of these collision prevention systems are reduced either to a single indicator light positioned on the instrument panel and lighting up on detection of a risk object or to a light module that merely emits a flash to the detected object, which does not allow the driver of the vehicle to discern the risk level associated with the object and determine which trajectory to take. This is particularly problematic when multiple objects are detected because the same alert is emitted for all objects regardless of the risk level associated with each object, thereby causing the driver difficulty in interpreting the alerts.

In addition, in order not to emit alerts in an untimely manner as soon as an object is detected, the alert is generally emitted by the alert system only when the collision risk is determined, which does not leave the driver time to react and results in the autonomous emergency braking being triggered in a sudden manner.

There is thus a need for a collision prevention method that makes it possible, on the one hand, to alert the driver of a risk of collision with an object sufficiently in advance so that they can anticipate and adjust their trajectory without untimely triggering of the autonomous emergency braking system and, on the other hand, for the driver to discern the risk levels associated with the detected objects so as to facilitate interpretation.

To those ends, the invention relates to a method for preventing collision of a host motor vehicle with at least one target object, the host motor vehicle comprising a detection system capable of detecting the target object and an alert system comprising at least one light module, characterized in that it comprises the following steps:

a. detecting the target object and determining a position and a speed of the target object by means of the detection system;

b. estimating a critical trajectory liable to be taken by the target object to bring it into collision with the host vehicle according to the position and speed of the target object, the critical trajectory being associated with a collision risk/collision time pair;

c. emitting at least one light alert to the driver of the host vehicle by means of the light module of the alert system, the type of the light alert to be emitted being selected according to the collision risk/collision time pair of the critical trajectory.

According to the invention, each target object detected by the detection system undergoes modeling to estimate a critical trajectory that might lead to a collision with the host motor vehicle. As a result, it is possible to alert the driver of the host motor vehicle of the presence of the object sufficiently in advance so that they can anticipate and modify their trajectory without triggering the autonomous emergency braking system. Furthermore, the invention makes it possible to modulate the type of light alert emitted by the alert system according to the estimated collision risk and/or collision time for collision between the host vehicle and the target object. Difficulties for the driver in interpreting the light alerts emitted by the alert system are thereby avoided by enabling them to clearly differentiate an object having a low collision risk from an object with a high collision risk.

What is understood by critical trajectory is a likely trajectory of the target object that might lead to a collision with the host vehicle. For example, it may be a relative trajectory of the target object with respect to the host vehicle, taking into account the trajectory of the host vehicle and in particular its position and speed at the time of detection of the target object. What is understood by collision risk associated with the estimated critical trajectory is the risk of collision between the target object if it took said critical trajectory and the host vehicle. What is understood by collision time is the time required for the target object to collide with the host vehicle when taking said critical trajectory.

Advantageously, the detection of the target object comprises the grouping together into a single target object of a plurality of obstacles detected separately by the detection system which are substantially next to one another. For example, the detection system may comprise one or more sensors of the host vehicle capable of detecting the presence of an object on the road and of estimating the speed and position, and in particular a radar and/or a lidar and/or a camera associated with one or more computers. Where applicable, the detection system can group together a plurality of obstacles detected separately into a single target object when the distance between the obstacles is less than a threshold value and/or when the speeds of the obstacles are substantially the same. In this way, a single light alert will be emitted to the driver of the host vehicle for all of the obstacles that are assumed to be taking one and the same critical trajectory, such as, for example, a group of people.

According to one embodiment of the invention, the estimation of a critical trajectory liable to be taken by the target object comprises:

a. estimating a plurality of distinct trajectories liable to be taken by the target object to bring it into collision with the host vehicle according to the position and speed of the target object, each trajectory being associated with a collision risk/collision time pair;

b. selecting a critical trajectory from among the plurality of trajectories according to the collision risk/collision time pair of each of the trajectories of the plurality of trajectories.

It is thus understood that the invention aims to model, on the basis of the information provided by the detection system relating to the target object, a plurality of trajectories liable to be taken by the target object and to select the trajectory that is likely to be the most dangerous in order to alert the driver. Advantageously, each of the trajectories of the plurality of trajectories is estimated on the basis of the position and speed of the target object determined by the detection system and of values representative of the accuracy of determination of said position and speed of the target object by the detection system. Specifically, the detection system may provide information relating to the target object according to a confidence interval. This feature makes it possible to model a plurality of trajectories that may be taken by the target object according to the error margin of the sensors of the detection system. Where applicable, the detection system may provide values relating to this accuracy of determination or error margin, such as, for example, a standard deviation or variance, for each of the determined positions and speed of the target object. The estimation of each of the trajectories of the plurality of trajectories thus comprises selecting a potential position and speed of the target object from among a sample of positions and speeds located within a confidence interval determined by the determined position and speed of the target object, by said values relating to the accuracy of determination of these positions and speeds and by a given probability distribution, for example a normal distribution.

Advantageously, the collision risk associated with each of the trajectories of the plurality of trajectories corresponds to the probability of an encounter between said trajectory and an estimated position of the host vehicle at a given time. For example, the collision risk associated with each of the trajectories is determined on the basis of the probability that the target object has the potential position and speed used to estimate said trajectory. If desired, the estimated position of the host vehicle at a given time is modeled by a template determined according to the position of the host vehicle estimated by a navigation system of the host vehicle and a value representative of the accuracy of estimation of said position by the navigation system. Specifically, in the same way as for the detection system, the navigation system of the host vehicle may estimate the position of the host vehicle with an error margin. Where applicable, a plurality of templates may be determined for the host vehicle, and each estimated trajectory of the plurality of trajectories may have a different collision risk with each of these templates. For example, the collision risk of an estimated trajectory with a given template may correspond to the multiplication of the probability that the target object has the potential position with the probability that the target object has the potential speed and the probability that the host vehicle is present in the given template.

Advantageously, the collision time associated with each of the trajectories of the plurality of trajectories corresponds to the time required for the target object to travel said trajectory and encounter the estimated position of the host vehicle at a given time, and in particular the given template.

Advantageously, the critical trajectory selected from among the plurality of trajectories corresponds to the trajectory that has the highest collision risk and the shortest collision time. Preferably, those trajectories with the highest collision risk are preselected and then that trajectory with the shortest collision time is selected from among the preselected trajectories.

According to one embodiment of the invention, a risk level associated with the target object is selected from among a plurality of predetermined risk levels according to the collision risk/collision time pair associated with the critical trajectory of the target object and in which a type of light alert is selected for the target object which corresponds to the selected risk level. For example, the risk level may be selected using only the collision risk or by weighting the collision risk with the collision time. Advantageously, the type of light alert is further selected according to the collision time associated with the critical trajectory of the target object.

Advantageously, a light alert of the same type is emitted for all of the detected target objects that have substantially the same risk level. Where applicable, a light alert may be emitted only for those detected target objects which have the same highest risk level. For example, a single light alert is emitted to alert the driver of the presence of those detected target objects which have the same highest risk level, notably a light pictogram centered between said detected target objects.

Advantageously, the alert system comprises a plurality of light modules, each light module of the alert system forming all or part of a road illumination system of the host vehicle, of a light signaling system of the host vehicle and/or of an interior illumination system of the host vehicle, the selection of the type of light alert comprising the selection, in particular according to the risk level associated with the target object, of one or more of said light modules of the alert system to be activated so as to emit a light beam producing said light alert. For example, for a low risk level, the light alert will be produced by activating an indicator light on the instrument panel of the host vehicle, while for a medium risk level, the light alert will be produced by activating a light module of the interior illumination system of the host vehicle and for a high risk level, the light alert will be produced by activating a light module of the road illumination system of the host vehicle.

Where applicable, the selection of the type of light alert may comprise the selection, in particular according to the collision time, of a predetermined region of the road for the emission of a light beam into said region of the road producing said light alert and/or of a type of light beam to be emitted. Specifically, it may be advantageous to differentiate the types of light alerts emitted when the collision risk is high but the target object is relatively far away from the host vehicle or conversely when it is close. For example, for a long collision time and a high collision risk, the light alert may be produced as a light flash illuminating the target object while for a short collision time and a high collision risk, the light alert may be produced as a projection of pictograms on the ground in a region of the road close to the host vehicle. It is thus understood that the type of light alert may change as the collision risk and/or the collision time associated with the target object changes.

The invention also relates to a computer program comprising a program code which is designed to implement the method according to the invention.

The invention also relates to a data medium on which the computer program according to the invention is stored.

BRIEF DESCRIPTION OF THE DRAWINGS

The present invention is now described using examples that are merely illustrative and that in no way limit the scope of the invention, and on the basis of the appended illustrations, in which.

DETAILED DESCRIPTION

In the following description, elements that are identical, in structure or function, and that appear in different figures retain, unless specified otherwise, the same references.

Figure 1:
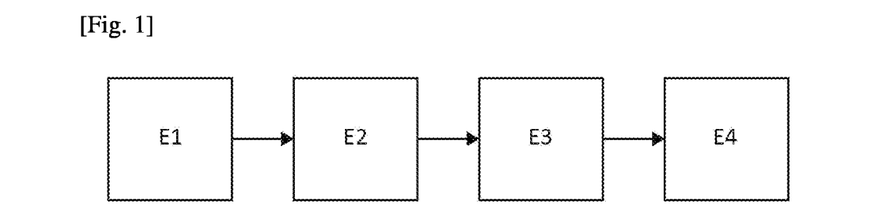
FIG. 1 shows a method for preventing the collision of a host motor vehicle with a target object according to one embodiment of the invention.

FIG. 1 shows a method for preventing the collision of a host motor vehicle H with a target object C according to one embodiment of the invention. The various steps E1 to E4 of the method will be described in conjunction with FIG. 2 to FIG. 5, respectively.

Figure 2:
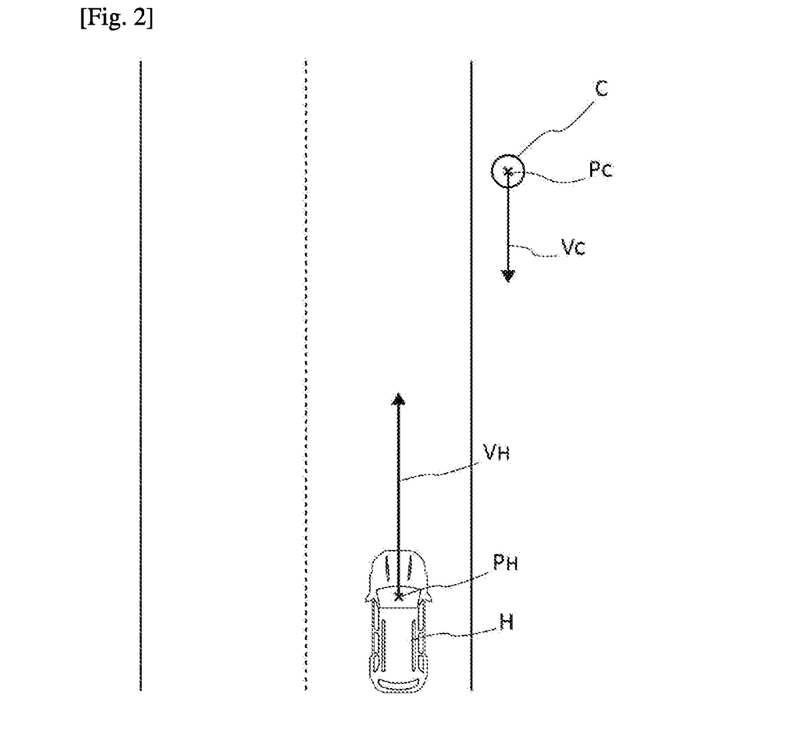
FIG. 2 illustrates a first step of the method of FIG. 1.

In a first step E1, a detection system of the host vehicle H, comprising, for example, a camera, detects the presence of a target object C, such as a pedestrian, on the road. The detection system further determines the position PC and the speed VC of the target object. Additionally, a navigation system of the host vehicle H provides the method with the speed VH and the position PH of the host vehicle at the time of detection of the target object C. FIG. 2 shows a view from above of the road scene with the host vehicle H and the target object C along with their respective positions and speeds.

In addition, each of the detection and navigation systems of the host vehicle H provides, for each of the position PH, PC and speed VH, VC values, a variance that represents the statistical error margin of this system in the determination of these values.

Figure 3:
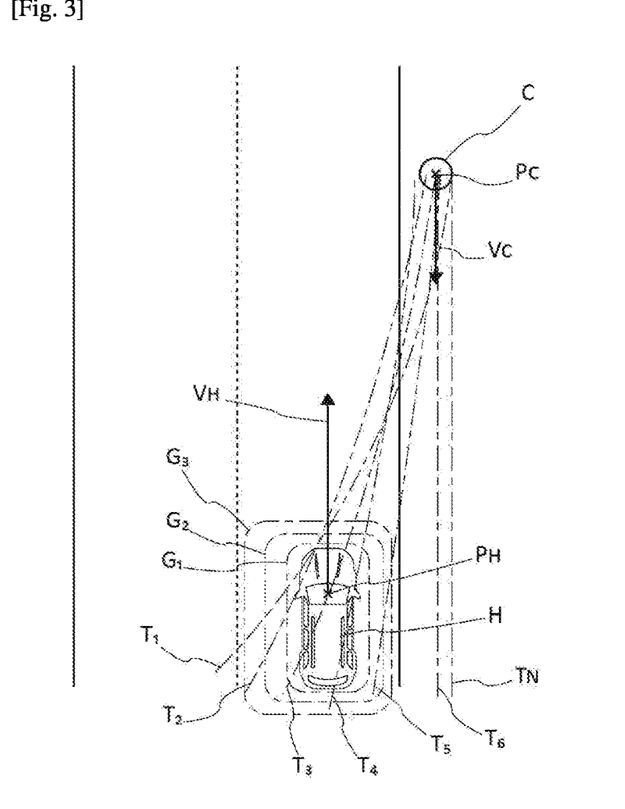
FIG. 3 illustrates a second step of the method of FIG. 1.

In a second step E2, a computer of the host vehicle determines samples of N potential position values and potential speed values of the target object which are located within confidence intervals respectively centered around the values PC and VC determined by the detection system and the sizes of which are defined by the variances relating to these values provided by the detection system. For each of these potential position and speed pairs, the computer estimates a trajectory T1 to TN liable to be taken by the target object C. Each of these trajectories Ti thus has a probability of being taken by the target object C, namely the probability that the target object C is actually in the potential position generating the trajectory Ti multiplied by the probability that the target object C moves at the potential speed generating the trajectory Ti, these probabilities being, for example, calculated according to a normal distribution. FIG. 3 shows these various trajectories T1 to TN, it being understood that in the example of FIG. 3, the trajectories T1 to TN of the target object C are relative trajectories of the target object C with respect to the host vehicle H and thus take into account the movement of the host vehicle H itself.

The computer further determines a plurality of templates G1 to GM representing a sample of potential positions of the host vehicle H which are determined according to the values PH and VH provided by the navigation system of the host vehicle and the variances relating to these values. Each of the templates Gj also has a probability that represents the probability that the host vehicle H is present in the template Gj.

It is observed in the view of FIG. 3 that some of the trajectories Ti are liable to encounter at least one of the templates Gj. These trajectories Ti are thus associated with a collision risk RC for collision with this template Gj, corresponding to the probability that the target object C takes the trajectory Ti multiplied by the probability that the host vehicle H is present in the template Gj. Additionally, the computer further associates each of the trajectories Ti liable to encounter at least one of the templates Gj with a collision time TTC corresponding to the time required for the target object C to travel said trajectory Ti and encounter the template Gj.

Figure 4:
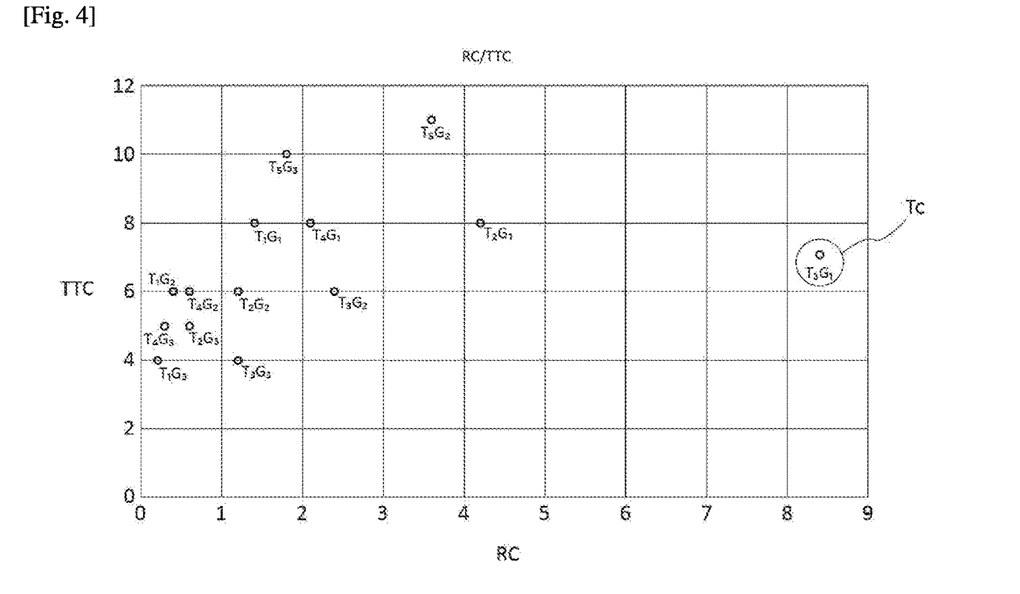
FIG. 4 illustrates a third step of the method of FIG. 1.

In a third step E3, the computer selects a trajectory TC, called the critical trajectory, from among the plurality of trajectories Ti liable to be taken by the target object C to bring it into collision with the host vehicle H. For this, the computer selects the trajectory with the highest collision risk RC. In the event that a plurality of trajectories have substantially identical maximum collision risks, the computer selects the trajectory with the shortest collision time. FIG. 4 shows the various collision risk RC/collision time TTC pairs for each of the trajectories Ti liable to encounter one of the templates Gj. In the example described, the trajectory T3G1 is thus selected as the critical trajectory TC.

Figure 5:
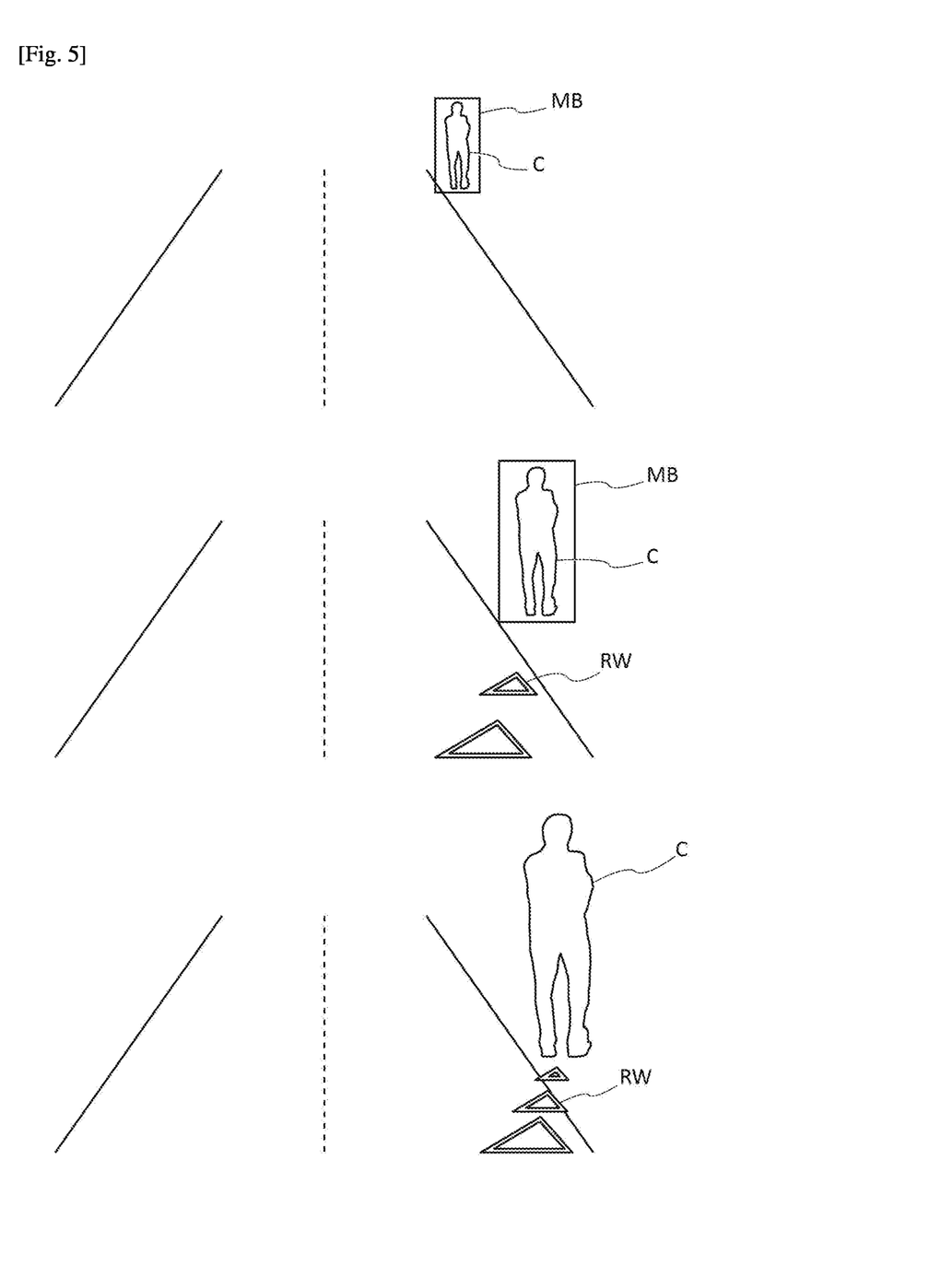
FIG. 5 illustrates a fourth step of the method of FIG. 1.

In a fourth step E4, the computer selects a risk level associated with the target object C from among a plurality of risk levels ranging from "very low" to "very high" according to the value of the collision risk RC for the critical trajectory TC.

The host vehicle H has an alert system comprising a plurality of light modules, each light module forming all or part of a road illumination system of the host vehicle, of a light signaling system of the host vehicle, or of an interior illumination system of the host vehicle. The computer thus selects, according to the risk level associated with the target object C, one or more of these modules to emit a light beam producing a light alert, the type of which is thus directly determined by the risk level associated with the target object C.

In the example described, the computer has selected, as the risk level associated with the target object, the "very high" level, which corresponds to the activation of a road illumination module of the host vehicle. In the embodiment described, the "very low" risk level may be associated with activation of an indicator light on the instrument panel of the host vehicle; the "low" risk level with the emission of a light beam of a first type by an interior illumination module of the host vehicle, the "medium" risk level with the emission of a light beam of a second type by the interior illumination module of the host vehicle and the "high" risk level with the emission of a light beam of a third type by the interior illumination module of the vehicle. For example, the interior illumination module comprises a strip of light-emitting diodes arranged in the passenger compartment so as to follow the contour of the passenger compartment, each diode being able to selectively emit an elementary light beam, the color and intensity of which are controlled by the computer. The light alert associated with the "low" risk level corresponds to the simultaneous and continuous emission of an elementary light beam of a first color, for example yellow, by all of the light-emitting diodes of the interior illumination module. The light alert associated with the "medium" risk level corresponds to the simultaneous and periodic emission of an elementary light beam of a second color, for example orange, by all of the light-emitting diodes of the interior illumination module. The light alert associated with the "high" risk level corresponds to the sequential emission of an elementary light beam of a third color, for example red, by each of the light-emitting diodes of the interior illumination module. The light alerts associated with the "low" and "high" risk levels, which have been described here, are non-limiting embodiments, it being understood that other types of light beams, other types of interior illumination modules, or other types of light modules of the motor vehicle may be selected for the emission of the light alerts associated with those risk levels.

Furthermore, the computer selects, according to the collision time TTC associated with the critical trajectory TC, a type of light beam to be emitted by said module and a region of the road into which this light beam is to be emitted. In the example described, the "very high" risk level and the TTC has resulted in the selection, and the emission by the road illumination module, of a white mask MB centered on the target object C. This light alert has thus been represented schematically in the scenario at the top of FIG. 5.

Of course, as the host vehicle H and/or the target object C moves, the risk level and the collision time TTC associated with the target object may change. The scenarios in the middle and at the bottom of FIG. 5 thus show the target object C and the host vehicle H getting closer to one another and thus the collision time TTC decreasing. Thus, the risk level remains "very high" with decreasing distance, such that the illumination module remains selected for the emission of the light alert. However, since the collision time TTC is decreasing, the type of light beam producing the light alert and the region of the road into which the light beam is to be emitted may change. In the example of the scenario in the middle of FIG. 5, corresponding to a medium TTC, the illumination module emits both a white mask MB centered on the target object C and a set of pictograms RW onto the ground. In the example at the bottom of FIG. 5, corresponding to a short TTC, the illumination module emits only a set of pictograms RW onto the ground.

Figure 6:
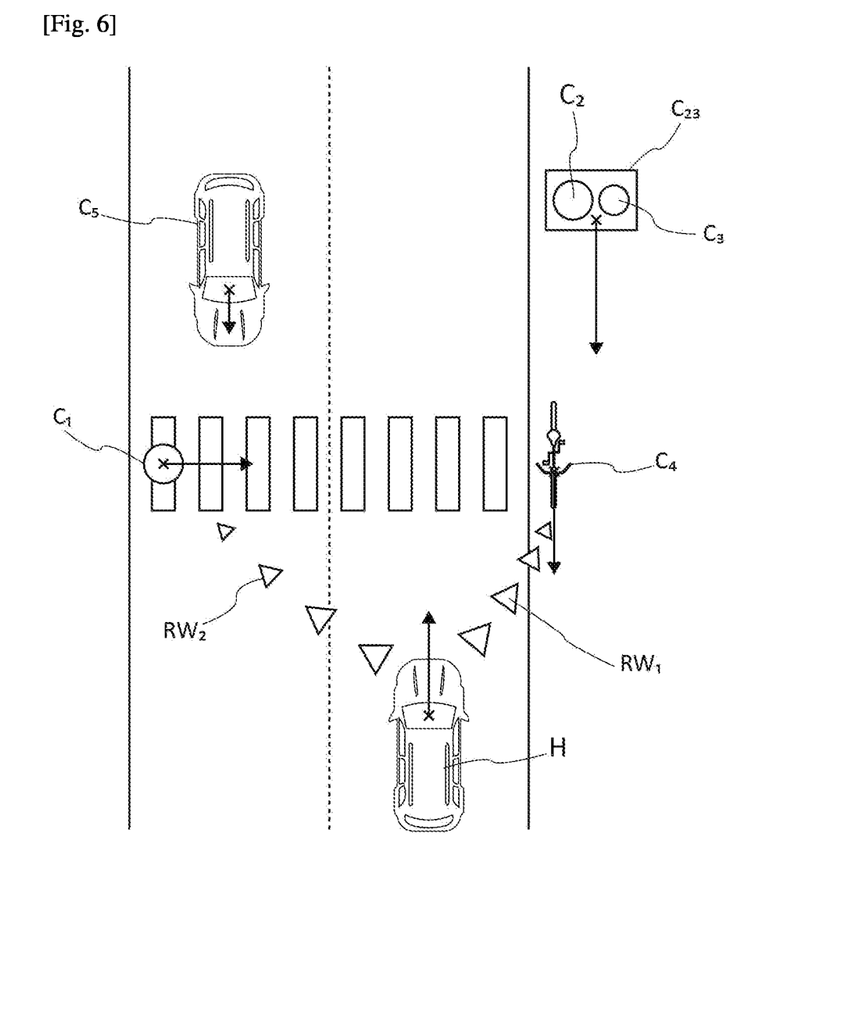
FIG. 6 illustrates one alternative implementation of the method of FIG. 1.

FIG. 6 shows a view from above of a road scene in which one variant of the method of FIG. 1 is implemented. In this scenario, the detection system of the host vehicle H detects the presence of a plurality of target objects, namely a crossing pedestrian C1, two pedestrians C2 and C3 walking side by side, a bicycle C4 and a vehicle coming in the opposite direction C5.

In the example described in FIG. 6, the method according to the invention performs, on completion of step E1 of FIG. 2, a grouping together of those objects detected separately which exhibit spatial proximity into a single target object, such as, for example, the pedestrians C2 and C3 into a single target object C23.

In addition, in the example described, each of the target objects C1, C23, C4 and C5 is associated, in steps E2 and E3, with a critical trajectory and with a collision risk/collision time pair. The computer then determines, in step E4, the risk level associated with each of these target objects. Unlike FIG. 5 and step E4 of the method of FIG. 1, one and the same light alert is thus emitted for those target objects which have the same highest risk level, the other target objects of lower risk level not generating any light alert. For example, the objects C4 and C1 have one and the same "very high" risk level while the objects C23 and C5 have a lower risk level. Two light beams RW1 and RW2 in the form of pictograms are thus emitted by the road illumination module of the host vehicle H to alert the driver. In one undescribed variant, a single light beam could be emitted between the objects C4 and C1 in order to alert, via a single alert, the driver of the presence of two obstacles that have one and the same risk level.

The foregoing description clearly explains how the invention achieves the set objectives, in particular by proposing a collision prevention method in which each detected target object undergoes modeling in order to estimate a critical trajectory that might lead to a collision with the host motor vehicle and in which the type of light alert emitted by the alert system according to the collision risk and/or collision time estimated between the host vehicle and the target object. It is thus ensured that the driver is warned of the presence of the target object sufficiently in advance to avoid triggering the autonomous emergency braking and that they can additionally clearly interpret the collision risk associated with the target object and translated by the emitted light alert.

In any event, the invention is not be limited to the embodiments described in this document, and in particular extends to any equivalent means and to any technically functional combination of these means. In particular, it is possible to envisage any other type of light alert than those described and in particular any light alert resulting from the simultaneous, synchronous or sequential emission of a plurality of light beams by different light modules.

What is claimed is:

1. A method for preventing collision of a host motor vehicle with at least one target object, the host motor vehicle includes a detection system capable of detecting the target object and an alert system including at least one light module, the method comprises:
   detecting, with the detection system, the target object and determining a position and a speed of the target object, with the detecting including grouping together into a single target object of a plurality of obstacles detected separately by the detection system which are substantially next to one another;
   estimating a critical trajectory liable to be taken by the target object to bring it into collision with the host vehicle according to the position and speed of the target object, the critical trajectory being associated with a collision risk/collision time pair; and
   emitting, with the light module, at least one light alert to a driver of the host vehicle, with the light alert to be emitted being responsive to the collision risk/collision time pair of the critical trajectory.

2. The method as claimed in claim 1, wherein a light alert of the same type is emitted for all of the detected target objects that have substantially the same risk level.

3. The method as claimed in claim 1, wherein the alert system comprises a plurality of light modules, each light module of the alert system forming all or part of a road illumination system of the host vehicle, of a light signaling system of the host vehicle and/or of an interior illumination system of the host vehicle, the selection of the type of light alert comprising the selection of one or more of said light modules of the alert system to be activated so as to emit a light beam producing said light alert.

4. The method as claimed in claim 1, wherein the selection of the type of light alert comprises selecting a predetermined region of the road for the emission of a light beam into said region of the road producing said light alert.

5. A method for preventing collision of a host motor vehicle with at least one target object, the host motor vehicle includes a detection system capable of detecting the target object and an alert system including at least one light module, the method comprises:

detecting, with the detection system, the target object and determining a position and a speed of the target object;

estimating a critical trajectory liable to be taken by the target object to bring it into collision with the host vehicle according to the position and speed of the target object, the critical trajectory being associated with a collision risk/collision time pair, by estimating a plurality of distinct trajectories liable to be taken by the target object to bring it into collision with the host vehicle according to the position and the speed of the target object, each trajectory being associated with a collision risk/collision time pair and selecting a critical trajectory from among the plurality of trajectories according to the collision risk/collision time pair of each of the trajectories of the plurality of trajectories; and     emitting, with the light module, at least one light alert to a driver of the host vehicle, with the light alert to be emitted being responsive to the collision risk/collision time pair of the critical trajectory.

6. The method as claimed in claim 5, wherein each of the trajectories of the plurality of trajectories is estimated on the basis of the position and the speed of the target object determined by the detection system and of values representative of the accuracy of determination of said position and speed of the target object by the detection system.

7. The method as claimed in claim 5, wherein the collision risk associated with each of the trajectories of the plurality of trajectories corresponds to the probability of an encounter between said trajectory and a position of the host vehicle estimated at a given time.

8. The method as claimed in claim 5, wherein the critical trajectory selected from among the plurality of trajectories corresponds to the trajectory that has the highest collision risk and the shortest collision time.

9. The method as claimed in claim 5, wherein a light alert of the same type is emitted for all of the detected target objects that have substantially the same risk level.

10. The method as claimed in claim 5, wherein the alert system comprises a plurality of light modules, each light module of the alert system forming all or part of a road illumination system of the host vehicle, of a light signaling system of the host vehicle and/or of an interior illumination system of the host vehicle, the selection of the type of light alert comprising the selection of one or more of said light modules of the alert system to be activated so as to emit a light beam producing said light alert.

11. The method as claimed in claim 5, wherein the selection of the type of light alert comprises selecting a predetermined region of the road for the emission of a light beam into said region of the road producing said light alert.

12. A method for preventing collision of a host motor vehicle with at least one target object, the host motor vehicle includes a detection system capable of detecting the target object and an alert system including at least one light module, the method comprises:

detecting, with the detection system, the target object and determining a position and a speed of the target object;

estimating a critical trajectory liable to be taken by the target object to bring it into collision with the host vehicle according to the position and speed of the target object, the critical trajectory being associated with a collision risk/collision time pair;

emitting, with the light module, at least one light alert to a driver of the host vehicle, with the light alert to be emitted being responsive to the collision risk/collision time pair of the critical trajectory, and     wherein a risk level associated with the target object is selected from among a plurality of predetermined risk levels according to the collision risk/collision time pair associated with the critical trajectory of the target object and wherein a type of light alert is selected for the target object which corresponds to the selected risk level.

13. The method as claimed in claim 12, wherein a light alert of the same type is emitted for all of the detected target objects that have substantially the same risk level.

14. The method as claimed in claim 12, wherein the alert system comprises a plurality of light modules, each light module of the alert system forming all or part of a road illumination system of the host vehicle, of a light signaling system of the host vehicle and/or of an interior illumination system of the host vehicle, the selection of the type of light alert comprising the selection of one or more of said light modules of the alert system to be activated so as to emit a light beam producing said light alert.

15. The method as claimed in claim 12, wherein the selection of the type of light alert comprises selecting a predetermined region of the road for the emission of a light beam into said region of the road producing said light alert.

\* \* \* \* \*